United States Patent [19]

Hilmersson et al.

[11] Patent Number: 4,704,509

[45] Date of Patent: Nov. 3, 1987

[54] INDUCTION APPARATUS AND METHOD FOR SEALING OF THERMOPLASTIC COATED PACKING MATERIAL

[75] Inventors: Anders Hilmersson, Helsingborg; Gert Holmström; Hans Selberg, both of Lund, all of Sweden

[73] Assignee: Tetra Pak International AB, Lund, Sweden

[21] Appl. No.: 896,096

[22] Filed: Aug. 13, 1986

[30] Foreign Application Priority Data

Aug. 22, 1985 [SE] Sweden ................................ 8503913

[51] Int. Cl.⁴ .............................................. H05B 6/40
[52] U.S. Cl. ................... 219/10.53; 219/10.43; 219/10.79; 156/274.2; 156/380.2
[58] Field of Search ............... 219/10.43, 10.41, 10.79, 219/10.53, 10.49 R, 10.67, 10.73, 10.57; 156/272.2, 272.4, 273.9, 274.2, 379.7, 380.2

[56] References Cited

U.S. PATENT DOCUMENTS

| | | | |
|---|---|---|---|
| 3,315,016 | 4/1967 | Wersosky . | |
| 3,444,346 | 5/1969 | Russell et al. | 219/10.79 X |
| 3,462,336 | 8/1969 | Leatherman | 219/10.53 X |
| 3,632,943 | 1/1972 | Engler et al. | 219/10.79 |
| 3,727,022 | 4/1973 | Hamilton | 219/10.53 X |
| 3,864,186 | 2/1975 | Balla . | |
| 4,054,770 | 10/1977 | Jackson et al. | 219/10.43 X |
| 4,060,443 | 11/1977 | Balla . | |
| 4,371,768 | 2/1983 | Pozna | 219/10.53 |
| 4,431,891 | 2/1984 | Forstner et al. | 219/10.43 X |
| 4,637,199 | 1/1987 | Steck et al. . | |

FOREIGN PATENT DOCUMENTS 346251 8/1972 Sweden .
8202828 8/1984 Sweden .

Primary Examiner—Philip H. Leung
Attorney, Agent, or Firm—Burns, Doane, Swecker & Mathis

[57] ABSTRACT

An arrangement for the sealing of thermoplastic-coated packing material of the type which includes at least one layer of an aluminum foil. The arrangement includes an inductor (3) connectable to a high-frequency source of current which is constituted of a U-shaped loop of electrically conducting material. The legs of the U-shaped loop are parallel and are situated close to each other, and the inductor (3) a core (10) of ferrite material between its legs. The core of ferrite material has local inserts (11) of ferrite material of substantially higher permeability than the surrounding portions of the core (10) and the local inserts (11) are installed in regions of the sealing arrangement where strong local heating is required in the sealing joint or where the sealing pattern needs to be influenced.

8 Claims, 5 Drawing Figures

INDUCTION APPARATUS AND METHOD FOR SEALING OF THERMOPLASTIC COATED PACKING MATERIAL

FIELD OF THE INVENTION

The present invention relates generally to packaging and, more particularly, to an arrangement for the sealing of thermoplastic-coated packing material. The invention also relates to the application of an arrangement in accordance with the invention for bringing about the sealing of packing material.

BACKGROUND OF THE INVENTION

In the technique of packaging the use of packing material comprising outer layers of thermoplastics has been known for a long time, where these outer layers are capable of being sealed to each other through fusing together after heating and compressing so as to obtain tight and permanently durable sealing joints. In this manner the packing material after forming, e.g. through folding or in some other manner, can be made to retain its given shape in that the outer layers of the packing material are placed against, and sealed to, each other. A form of package manufacture which has found much application consists in that a web of packing material is formed to a tube by combining the longitudinal edges of the web in an overlap joint and sealing the web edges to each other. The tube formed can then be filled with contents, e.g. a liquid, whereafter the tube filled with liquid can be divided up to individual containers through transverse sealing of the tube along narrow zone placed at equal distances from each other. The sealed tube portions may be given before, or in connection with, the transverse sealing a lasting, e.g. parallelepipedic, shape through folding of the material, whereupon the closed tube portions are separated from the rest of the tube and form individually finished consumer packages.

It has been found that the sealing of packing material is facilitated considerably if the packing material comprises a layer of metal foil, preferably aluminium foil, at least in the regions of the sealing joints. The reason wherefore the presence of such a metal foil layer facilitates the sealing procedure is that it is relatively easy to induce electric currents into the aluminium foil layer of the packing material with the help of a so-called inductor or coil which in principle consists of ane lectric conductor brought into the desired shape which forms one or more coil windings and which is connected to a current source which feeds high-frequency alternating current to the coil. (As a rule frequencies between 2 MHz and 100 kHz are chosen). When a high-frequency current is passed through the coil or the inductor a high-frequency magnetic field is generated around the same, and if the coil is placed close to a material containing a metal layer induction currents are induced in this metal layer which give rise to a genertion of heat in the parts to which the current is conducted. This heat generated in the metal foil layer is readily passed over to adjoining layers of thermoplastic material of, e.g. polythene, which thereby are made to soften or melt, and if the material layers wherein the heat has been generated are compressed against another similar material layer with a thermoplastic coating, the thermoplastic layers in the region of heating will fuse together to form a tight and durable joint. In order to concentrate the magnetic field and to obtain narrow heating zones it is appropriate to arrange the inductor as near as possible to the metal foil layer, that is to say the inductor ought to be pressed against the material which is to be sealed, and the magnetic filed can be concentrated further with the help of an insert or a core of ferrite material which is arranged between the coil windings in the inductor. On sealing a tube it is desired in most cases that each seal should comprise two narrow sealing zones which are parallel and arranged relatively near to each other, the sealed tube being separated in the unsealed region between the said narrow sealing zones.

It is also known that in order to obtain a better sealing joint the inductor can be designed in a special manner which in principle consists in that a part of the surface of the inductor facing towards the packing material is provided along a part of its surface with a projecting ridge which means that the packing material along a part of the sealing zone is subjected to a substantially higher sealing pressure, since the packing material within this zone is compressed through the said projecting portions of the inductor. However, this sealing pressure can become so great that a "cut-effect" is obtained, that is to say that the inside plastic layer along the edge of the projecting ridge is compressed to such an extent that the plastics is wholly forced out and in practice forms a "cut" in the continuous inner plastic coating. As a rule this is of no importance, since this cut-effect occurs within the selaing joint and thus normally does not bring about any risk of leakage. It has been found, however, that in certain cases, and especially if modern high-frequency generators are used where the frequency conversion is done with the help of thyristors and transistors, the feed frequency has to be kept lower than is the case with generators where the frequency conversion is done with the help of electrn tubes. An effect which arises if a feed frequency is used which is substantially lower than that used previously, e.g. 200 kHz instead of 1.0 MHz as used normally, has turned out to be that the magnetic field around the inductor, and consequently also the electric circuit obtained in the metal foil layer in the edge portions of the packing material, that is to say along edge zones where the metal foil coating edges end, will be more rounded, which means that the sealing join along its end edges will be slightly bent. This in turn means that the said cut-effect which is obtained along the inserted portion of the inductor will produce a weakening of the inner plastic layer which owing to thr rounding of the sealing joint will have the result that the effective width of the sealing joint in the edge zones will be appreciably reduced and, in the worst case, the sealing may be absent altogether in the edge zones owing to the sealing joint curving in "behind" the cut-line or weakening line which is brought about with the help of the said projecting ridge of the inductor.

This phenomenon can be remedied, however, in accordance with the present invention if the sealing arrangement is designed in the manner characterizing the invention.

BRIEF DESCRIPTION OF THE DRAWING

A preferred embodiment of the invention will be described in the folliwing with reference to the attached drawings, wherein.

DETAILED DESCRIPTION OF THE PREFERRED EMBODIMENT

Figure 1:
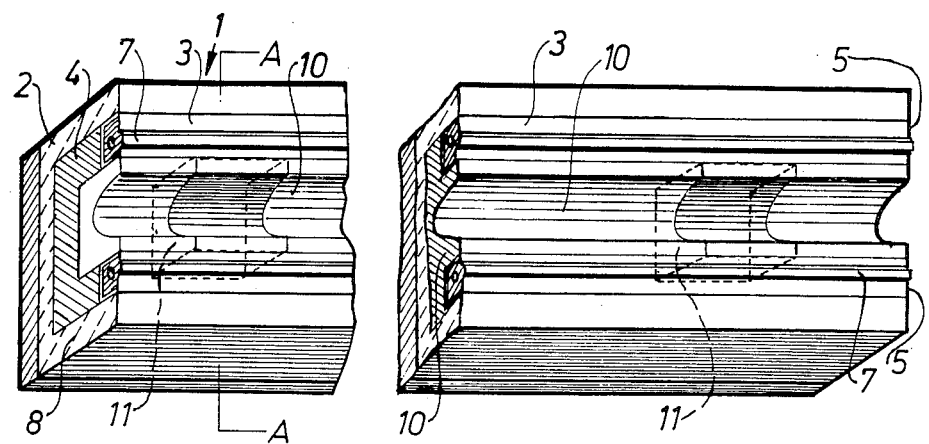
FIG. 1 is a perspective view, partially in cross-section of a sealing jaw in accordance with the invention.
Figure 2:
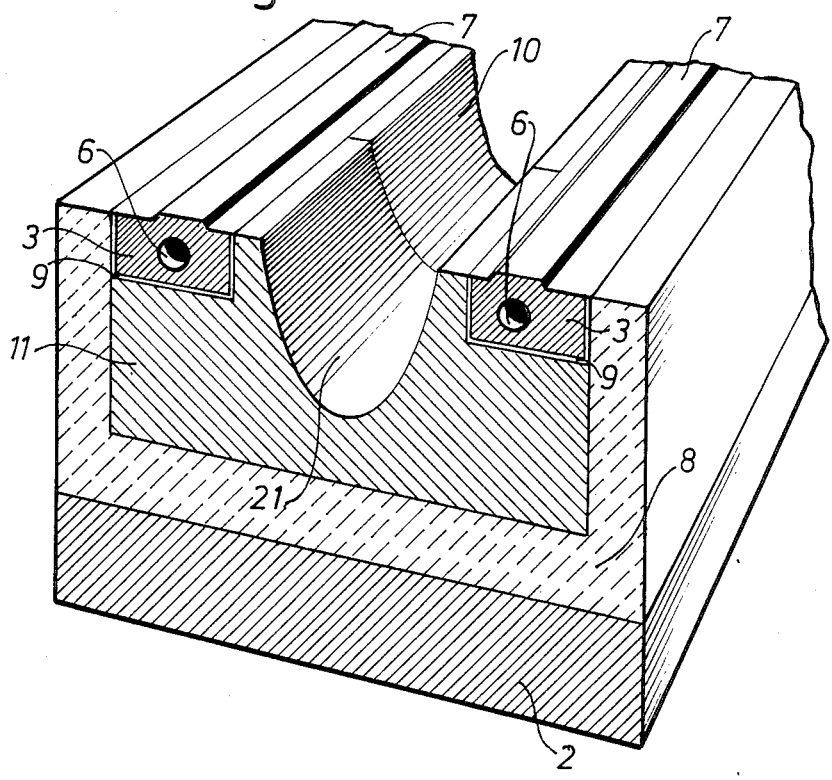
FIG. 2 is a cross-sectional view along the line A—A of the sealing jaw which is shown in FIG. 1.

A sealing arrangement or inductor 1 of the type as shown in FIG. 1 is intended to be installed in a machine component which is subjected to the desired sealing movement and which exercizes the desired sealing pressure. In other words, the said sealing component or sealing jaw 12, as it is often called, is driven in a relative movement against a so-called counter-jaw or holding-up jaw (14) which in most cases is also movable. the said sealing jaws 12, 14 are driven against each other whilst taking up between them the packing material 13, e.g. a packing material tube which is to be sealed, and when the sealing jaws 12, 14 are compressed against the tube a high pressure is exercized on the compressed material layers at the same time as heat is generated in the sealing area with the help of the inductor. The inductor shown in FIG. 1, which is designated 1, frequently has a steel sheel 2 to provide the inductor with the necessary stability. The effective element of the inductor, however is the actual inductor coil or the conductors 3 which in the case illustrated consist of a coil with only one winding. The coil (or the inductor conductors) in the case illustrated is U-shaped and comprises two straight conductors 3 which are closed through the connecting conductor 4 which in the case illustrated has been drawn down on the end side of the arrangement. To the inductor coil 3 is fed a high-frequency current with the help of a power supply element not shown here and the connecting up of the coil takes place at the ends 5. The conductors 3 in the coil consist of profiled bars which, as is evident from FIG. 2, are substantially rectangular in their cross-section and have a continuous channel 6 through which cooling water can be conducted in order to maintain the conductors 3 at a suitable temperature. The conductors 3 are provided, moreover, with longitudinal raised ridges 7, which are also called "beams", whose function will be described in the following.

The inductor coil 3 is fixed into a material 8 which is electrically non-conducting, and between the conductors 3 a core 10 of ferrite material is arranged which is insulated from the conductors 3 with the help of an insulating layer 9 which also serves as an adhesive. Between the conductors 3 a channel 21 may be included in the core 10 in the manner as shown in FIG. 2 and whose function will be described later. As can be seen from FIG. 1 the core 10 is not wholly homogenous but has inserted portions 11. These inserted portions 11 of the core ought to have essentially the same cross-section as the remaining core but, above all, the inserted portions 11 should consist of a ferrite material with substantially higher permeability than surrounding portions of the core 10.

Figure 3:
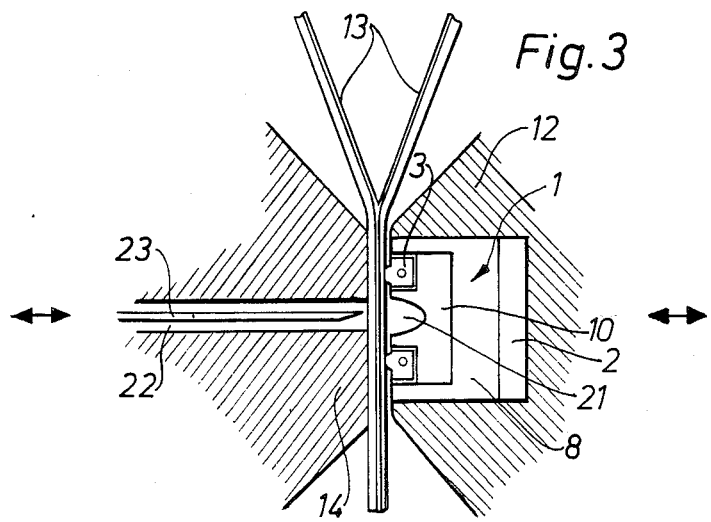
FIG. 3 is a cross-sectional view of a sealing jaw and a counter jaw in accordance with the invention.
Figure 4:
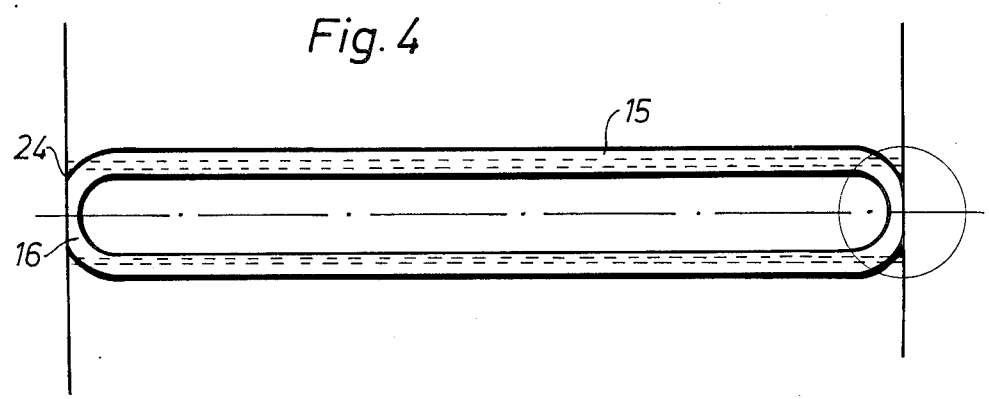
FIG. 4 is a schematic view of the heated area obtained with a sealing jaw of the present type.

In FIG. 3 is shown how the inductor or sealing arrangement 1 is installed in a sealing jaw 12, this sealing jaw being arranged to move to and fro against a counter-jaw or holding-up jaw 14. Naturally the sealing jaws 12 and 14 also may have a movement in vertical direction, but since this is of no interest in discussing the present invetnion, we can disregard this. When the sealing jaws 12 and 14 move against each other two layers of packing material 13 are taken up between the sealing jaws 12, 14, and the packing material layers are compressed against each other with great force in the area between the sealing jaws. At the same time, as mentioned previously, the inductor coil 3 is connected to a current source which supplie shigh-frequency current (a frequency between 2 MHz and 100 kHz) which means that a strong magnetic field arises around the inductor. As it is assumed that the packing material comprises a layer of aluminium foil which is placed adjoining the inside layer of thermoplastics of the packing material a current is induced in the metal foil layer which causes the metal foil layer to be heated up rapidly and transfer its heat to the adjoining thermoplastic layer which is made to melt and combine with adjoining inside thermoplastic layers of the adjoining packing material layer. This heating is achieved rapidly and effecitvely and the metal foil layer may be regarded in principle as constituting a short-circuited winding in a transformer where the inductor coil constitutes the primary winding. If the inductor coil 3 is placed tightly up to the aluminium foil layer wherein a current is to be induced the circuit in the aluminium foil layer will be very distinct and the heat generation limited to narrow areas whose width substantially corresponds to the width of the inductor conductors 3. As is evident from FIG. 4, which shows the sealing area 15 as brought about by means of the inductor, it is noticeable that the sealing joint 16 curves a little at the edge 24 of the packing material or, more particularly where the aluminium layer comes to an end, forming a long and narrow O-shaped area which corresponds to the said short-circuited winding in the fictitious transformer as formed by the inductor coil 3 and the aluminium foil layer of the packing material. As is evident from FIG. 4, the circuit, and consequently the sealing area 15, are somewhat crooked in the area 16 at the edges 24 of the packing material owing to the fact that the current when it closes in the edge zones "takes a short cut" and does not continue in a straight path out to the edge 24 of the packing material. It has been found that the curving of the circuit, and consequently of the sealing area 15, is a function of the particular feed frequency of the current to the inductor 3. Thus the curving phenomenon is considerably less pronounced if a feed current of a frequency in the region of 2 MHz is used, whilst the curcuit curves off considerably earlier and with a greater radius of curvature if the feed frequency of the current is e.g. 200 kHz.

High-frequency generators equipped with electron tubes can be manufactured easily for frequencies of approx. 2 MHz and a typical frequency used is 1.8 MHz. Such generators have been in use for a long time, but are bineg replaced now by more modern, less expensive and more reliable high-frequency generators which are equipped with semiconductors. These high-frequency generators equipped with semiconductors cannot be produced for frequencies higher than approx. 200 kHz without appreciable costs and complications, so that the sealing system had to be adapted to this lower frequency. The curvature of the sealing area 15 in the edge zones 24 of the packing material, which previously had been no problem, is now noticed and acted against, in particular when sealing jaws with longitudinal so-called beams (7 in FIG. 2) are used.

The introduction of these longitudinal beams 7 on the U-shaped conductors 3 has produced in many cases considerably better sealing strength. The reason for this is that a sealing jaw without these beams 7 will press out the melted thermoplastics form the sealing area which means that the remaining plastic layer will be very thin and the sealing joint correspondingly weak. The use of such beams is known from Swedish Pat. No. 81059602, related to U.S. Pat. No. 3,864,186. Through the harder compression of the sealing material along the extension of the beams 7 the outflow of the plastic material within the sealing area is prvented. Naturally the beams 7 must not be too high and a typical "beam height" is approx. 0.3 mm which can be used when the packing material comprises a paper layer which can be compressed. However, the beams 7 not only prevent the flowing out of the plastic within the sealing area, but they effectively force out the plastic from the area under the beams and act as a cutting element which disrupts the continuous plastic layer at the beam edges. As mentioned earlier the beams 7 used have been found to play an important part in accomplishing more secure and more durable sealing joints but, as is evident from FIG. 4 and FIG. 4a, the beams 7 will "cut" the inner plastic layer at the edge zones 16 of the packign material, or force it out, so that only a very narrow sealing zone, or in the extreme case, no seal at all, is formed, that is to say a risk of leakage, or actual leakage already at the sealing stage, arises.

Figure 4A:
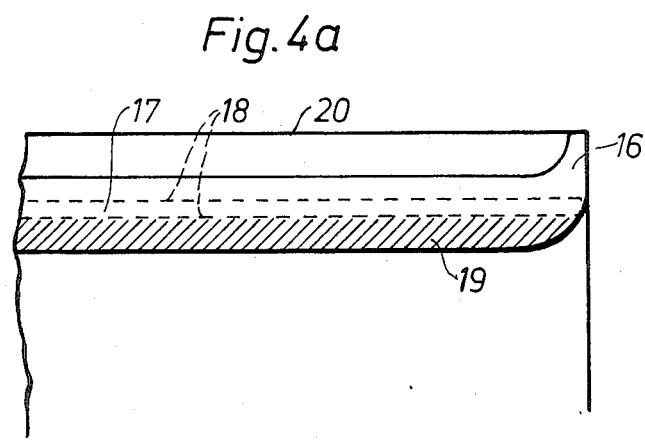
FIG. 4A is an enlarged view of a portion of FIG. 4.

IN FIG. 4A the contact area of the beams 7 is marked 17 which is the area inside the broken lines 18 which mark the delimitation edges of the beams 7. The sealing zone is designated 19 and the cutting edge along which a packing container is severed from the rest of the packing material is marked 20. In the edge area 16 the seal 19 curves in towards the contact surface 17 of the beam 7 which causes the width of the sealing joint in this area to become less. since the curvature of the sealing area becomes greater on using lower feed frequencies to the said generator it may happen that the curvature becomes so great that the sealing area 19 does not reach as far as the edge of the packing material but instead crosses the contact surface 17 of the beam 7, and in this case an unsealed portion is produced at the edge zone of the packing material which gives rise to a leakage.

It has been found, therefore, that it is difficult to use sealing jaws 12 with beams 7 at the same time as using modern high-frequency generators with lower feed frequency. This disadvantage is overcome, though, in that in the regions of the inductor coil where the edge of the packing material is crossed the magnetic field pattern is altered, and thereby also the circuit of the induction current, by providing the inductor with inserts 11 of ferrite material of substantially higher permeability than the permeability of the core material 10. A typical example consists in using for the core material 10 a material of permeability 5 whereas the permeability for the ferrite material 11 inserted is approx. 25, that is to say five times higher. Owing to the said insert 11 of a ferrite material of high permeability the magnetic field is made to close nearer the edge of the packing material, which means that the current in the aluminium foil layer too will flow closer to the edge of the packing material, that is to say the tendency to deviate, or the tendency to curve, of the circuit becomes less, which inturn means that the sealing area will extend out to the edge zone of the packing material in such a manner that the beams 7 used on the sealing jaws will not cut apart, or press apart, the thermoplastic layer outside the sealing area 19 so that a leakage arises. Owing to the insert 11 of ferrite material of high permeability an enhanced heating effect too is achieved, since the magnetic field is concentrated within the area. The current which flows through the circuit in the aluminium foil layer is, of course, constant, but by altering the magnetic field the circuit can be constricted at the places where inserts 11 are situated so that the heating effect locally becomes greater. This means that inserts 11 also may be installed at places other than just the edge zones of the packing material if there is a need for a locally stronger heating along some section of the sealing joint, e.g. in connection with the application of the tear-strip etc.

As is evident from FIG. 1 a groove 21 is provided in the core 10 and likewise in the insert 11 whose function is to facilitate the cutting or severing of the packing material between the sealing lines produced with the help of the inductor 1. As can be seen from FIG. 3, the holding-up jaw 14 is provided with a transverse duct 22 wherein moves a knife 23 performing a controlled reciprocting movement. When the sealing of the packing material 13 has been concluded, and whilst the sealing jaws 12 and 14 are still engaged with each other, the knife 23 is moved forward so that the packing material present between the sealing jaws 12 and 14 is severed in the region between the seals produced. In order that the knife 23 should be able wholly to cut through the packing material 13, a groove 21 is provided in the core 10 and in the insert 11 so that the knife can move right through, and a little past, the compressed packing material 13 which is thus cut through between the sealing joints. After the sealing opeation and the severing operation the sealing jaws 12 and 14 may be moved apart from each other whilst the sealed packing unit can be shaped further or processed further to achieve its final appearance.

Thus the present invention is built on the principle that the ferromagnetic ferrite core 10 of the inductor coil 3 does not have a uniform permeability but that differences in permeability exist along the length of the core 10. The permeability constant is a measure of the ratio between the magnetic flux density and the magnetic field strength of a material and has the dimension H (Henry) per metre (H/m) or volt-second per ampere-metre (Vs/Am). For air the permeability is equal to $4\pi \times 10^{-7}$ whereas for ferritic material it may rise to values which are more than a million times greater. In the case discussed here ferrite materials are used which both have high permeability but where the ferrite material in the insert 11 has a substantially higher permeability than the ferrite material in the remaining part of the core 10.

As mentioned before, it is advantageous to provide a core 10 of ferrite material between the conductors 3 of the inductor also within the regions of the inductor which do not coincide with the edge zones of the sealed object where in accordance with the invention, an insert 11 of a highly permeable ferrite material is to be plaed. Especially in the case of thinner packing material, where the distance between the conductors 3 of the inductor and the aluminium foil layer of the packing material is small, and the "coupling" between the inductor and the alumiuium foil layer, therefore, is good, an acceptable sealing result can be achieved even if the ferrite core 10 is excluded and is replaced instead by an electrically insulating material. The insert 11 of substantially higher permeability than surrounding portions, on the other hand, has to be placed to the parts of the inductor which are brought into contact with the edge zones of the sealing object, since otherwise the advantages aimed at are not obtained. In certain cases it is desired that the sealing lines in the edge zones of the sealing object sould be "oblique" so that the sharp corners, which are formed on severing of the packages by means of cuts between the sealing lines, can be cut away without the sealing line being broken. It has been difficult up to now, when using high-frequency induction sealing, to arrange such diverging sealing lines, since an "angling out" of the conductors 3, so that they diverge at the passage of the edge zone of the sealing object (e.g. an angling out by 45° to make possible a "blunting" cut-off of the corner parts of the sealing fins), results in that the electri cicrcuit induced into the aluminium foil layer does not follow the extension of the angled-out conductors 3 but endeavours instead to take a "short-cut" to the edge zone of the material. This means that the circuit is spread out over a larger surface and that the current density in the aluminium foil layer becomes so low that the heat required for sealing of the plastic layer is not generated which results in the absence, or in the weakening, of the seal with consequent leakage risk.

By arranging ferrite inserts of high permeability along the diverging parts of the conductors 3 the electric circuit generated in the aluminium foil layer is forced substantially to follow the extension of the conductors, and the circuit becomes so concentrated that sufficient sealing heat is generated in the aluminium foil layer. After the sealing operation the individual packages can be separated by means of cuts between the sealing lines, and the sharp corner portions of the sealing fins formed can be cut off or punched out outside the angled sealing line formed.

It has been found that the arrangement in accordance with the invention is simple to manufacture, that is inexpensive and very effective. Through application of the invention to sealing arrangements it is possible to use inexpensive and reliable high-frequency generators which operate at a lower frequency than previously known generators without any disadvantage arising from the use of the lower frequency. In the present description it has been assumed that the inductor coil is constituted of a single winding only. It may be appropriate, however, in certan cases to use an inductor coil with several windings and in those cases too the invention can be applied.

While this invention has been illustrated and described in accordance with a preferred embodiment, it is recognized that variations and changes may be made and equivalents employed herein without departing from the invention as set forth in the claims.

What is claimed is:

1. Apparatus for sealing thermoplastic-coated packing material having at least one layer of metal foil, the apparatus comprising a sealing jaw having a base of electrically non-conducting material and a core of ferrite material of a predetermined permeability; said sealing jaw including an inductor having a pair of substantially parallel conductors spaced apart from each other, an electrically insulating material between said conductors and said core, said core having a groove extending between said conductors, and said core having inserts of a second material provided at predetermined locations between said parallel conductors, said second material being of higher permeability than the predetermined permeability of said ferrite material.

2. Apparatus in accordance with claim 1, wherein said inserts are provided with a body with one or more ridges projecting from the body, said ridges being arranged to be contained in the region between the said parallel conductors which are arranged to rest with their underside against said body.

3. The apparatus in accordance with claim 1, wherein the inductor has a U-shaped loop of electrically conductive material, said U-shaped loop having legs forming said conductors, said conductors having raised beams extending longitudinally of said conductors, said conducors having opposite ends and said inserts being positioned adjacent said ends whereby locally stronger heating is achieved adjacent said ends to form an effective sealing joint.

4. Apparatus in accordance with claim 3, wherein said second ferrite material has a permeability which is three to ten times higher than the permeability of the first ferrite material in the core of the inductor.

5. Apparatus in accordance with claim 3, wherein the substantially parallel parts of the U-shaped conductors are arranged in a sealing jaw which is adapted so that it can be pressed against a counter-jaw while the material intended for sealing is present between the jaws at least said parallel conductors being arranged substantially in the compression surface of the sealing jaws.

6. Apparatus in accordance with claim 5, wherein said parallel conductors have longitudinal slightly projecting ridges along which the compressive force against the portion of the packing material intended for sealing is locally increased.

7. Apparatus in accordance with claim 1, wherein said substantially parallel conductors diverge in the regions where said inserts of said second material are arranged so that the distance between the conductors increases, the said inserts being designed so that they follow the diverging extensions of said conductors which are adapted to coincide during the sealing operation with edge zones of the sealed material.

8. A method for sealing a package manufactured from a packing material having thermoplastic layers that are fused together upon the application of heat and pressure, the method comprising:
 advancing said packing material between a sealing jaw and a counter jaw,
 closing said jaws by movement toward each other to clamp said packing material between them, said sealing jaw havng a pair of substantially parallel conductors spaced apart from each other and having a core of ferrite material,
 said core having inserts of a second material provided at predetermined locations between said parallel conductors, said second material being of higher permeability than the predetermined permeability of said ferrite material,
 applying electric current of high frequency to said conductors to induce non-uniform heating of the packing material along said conductors, said non-uniform heating including zones of substantially greater heating than other zones along said conductors, said zones being adjacent opposite ends of said conductors, and
 severing said packing material by projecting a knife from said counter jaw and into a groove between said conductors.

* * * * *